Sept. 10, 1929. A. A. THOMAS Re. 17,432

ELECTRIC SOUND REPRODUCER

Filed Jan. 23, 1926

INVENTOR

Adolph A. Thomas

Reissued Sept. 10, 1929.

Re. 17,432

UNITED STATES PATENT OFFICE.

ADOLPH A. THOMAS, OF NEW YORK, N. Y.

ELECTRIC SOUND REPRODUCER.

Original No. 1,630,641, dated May 31, 1927, Serial No. 83,191, filed January 23, 1926. Application for reissue filed February 13, 1929. Serial No. 340,935.

My invention is for a new and improved sound reproducer, which may be used as a telephone transmitter, as an electric phonograph reproducer, and for similar purposes.

Briefly stated, my invention comprises a novel form of electromagnetic mechanism in which a vibratory magnetic member produces flux variations in a magnetic shunt path. This shunt path includes a magnetic core having an airgap, and this core is surrounded by a current-generating coil. As the magnetic member vibrates in proximity to the polar faces of the magnet, it varies the magnetic flux through the coil with amplified effect. This is due to the fact that the magnetic member and the coil are included in two parallel magnetic paths; hence, the vibratory member simultaneously varies the magnetic flux through the two paths in opposite relation. That is to say, when the magnetic member moves toward the pole pieces it increases the flux through the main path and simultaneously decreases the flux through the shunt path. The next instant, when the magnetic member recedes from the polar faces, most of the field flux passes through the coil. Consequently, slight vibrations of the magnetic member produce an amplified magnetic effect on the coil. The current impulses thus generated in the circuit of the coil may be amplified to operate a loudspeaker or used for any other practical purpose.

If the instrument of my invention is constructed as a telephone transmitter, the vibratory magnetic member is in the form of an acoustic diaphragm. In employing my invention for an electric phonograph reproducer, the vibratory member is connected to a needle arm.

In order to enable those skilled in the art to understand my invention fully and clearly, I have shown in the accompanying drawings, by way of example, an electric phonograph reproducer constructed in accordance with my invention. In these drawings, Fig. 1 shows an inside view of an electric phonograph reproducer embodying my invention, a portion of this view being taken on section line 1—1 of Fig. 2 for the sake of clearness;

Figure 1:
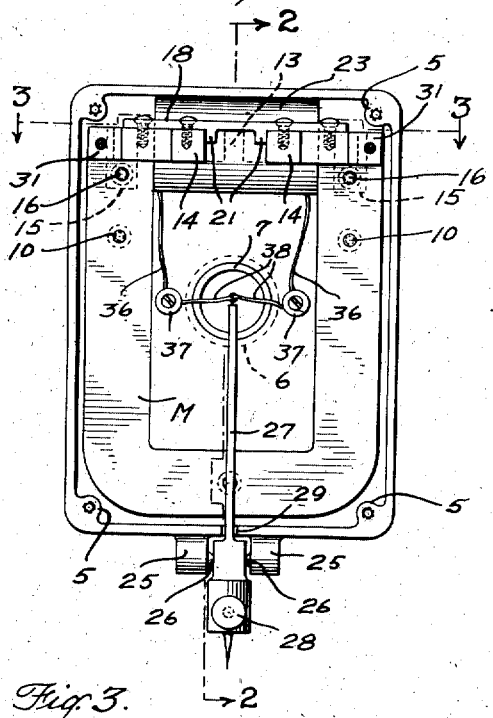

Before proceeding with a detailed description of the drawings, I want to point out that the various views are on an enlarged scale and the dimensions of the parts have been purposely exaggerated in order to make the figures as clear as possible. The drawings are therefore not to be taken as shop drawings with accurate dimensions. Such details are relegated to the mechanic.

There is a casing indicated as a whole by C for carrying the different parts that make up the instrument. This casing may be made of suitable non-magnetic material, such as aluminum or an aluminum alloy, or it may be molded from a composition having the requisite hardness and strength. In the present instance, the casing is substantially rectangular in shape, and consists of a back-plate 1, a body section 2 and a front plate or cover 3. These parts may be separably secured together by screws 4 engaging in bosses 5 at the corners of the body section 2. If the casing is made out of molded material, the parts 1 and 2 may be shaped as a single piece. The back-plate 1 of the casing is provided with a cylindrical hub 6 by means of which the reproducer is mounted on the free end of a supporting arm 7, here shown as a tube. A set-screw 8 engages in an axial slot 9 of the hub 6 to hold the reproducer in correct playing position on the arm 7, which is supposed to be properly mounted at its other end to permit horizontal movement of the reproducer across the record, as will be understood without further description.

Figure 4:
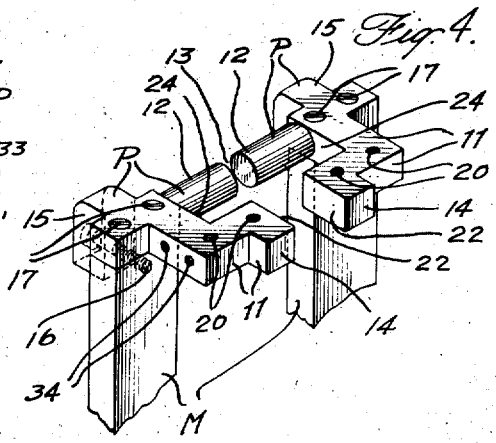
Fig. 4 is a detached perspective view showing the construction and arrangement of the magnetic pole pieces.

In casing C is mounted a magnet indicated as a whole by M. This magnet, which is preferably of the permanent steel type, is U-shaped and closely follows the rectangular outline of the casing, so as to secure a maximum length of magnet in a small space. For convenience, the magnet is here shown as secured to the back wall 1 of the casing by means of screws 10. To the polar ends of magnet M are secured a pair of pole pieces P. The construction and shape of these pole pieces is best shown in Fig. 4, where it will be seen that each pole piece comprises a pair of limbs 11 and 12. The limbs 12 are straight extensions in axial alignment and separated to provide an airgap 13. The limbs 11 project forwardly and terminate in aligned polar faces 14. Each pole piece may be formed at the rear with a downwardly extending flange 15 arranged to lie flat against the body of the magnet and to receive a fastening screw 16. Additional screws 17 pass through the polar extensions 12 downwardly into the magnet. In this way, the pole pieces P are rigidly secured to the body of the magnet. In order to facilitate the assembling and adjustment of the pole pieces P, they are preferably connected by a non-magnetic plate 18, which is fastened to the limbs 11 by screws 19 arranged to enter holes 20 in the pole pieces. By providing the underside of plate 18 with lugs 21 arranged to engage the sides 22 of the pole pieces, the correct spacing of the latter is automatically accomplished by attaching the plate 18. This plate also permits the handling of the two pole pieces as a single rigid unit.

On the polar extensions 12 is mounted a current-generating coil 23, which preferably fits snugly between the sides 24 of the pole pieces and is thus firmly held in place without additional fastening means. If necessary, the casing C may be formed with a bulge 24′ to accommodate the coil 23. It is understood, of course, that the coil 23 is inserted in position on the pole pieces before the same are connected together by the plate 18. The polar extensions 12 constitute a magnetic core for the coil 23, and the airgap 13 is of such width as to provide a magnetic path of predetermined reluctance. As will be clear from Fig. 4, the polar extensions 11 and 12 provide parallel magnetic paths for the field flux. The path through the forward projections 11 may be considered as the main path, and the core-forming extensions 12 form a shunt path through the coil 23.

Figure 2:
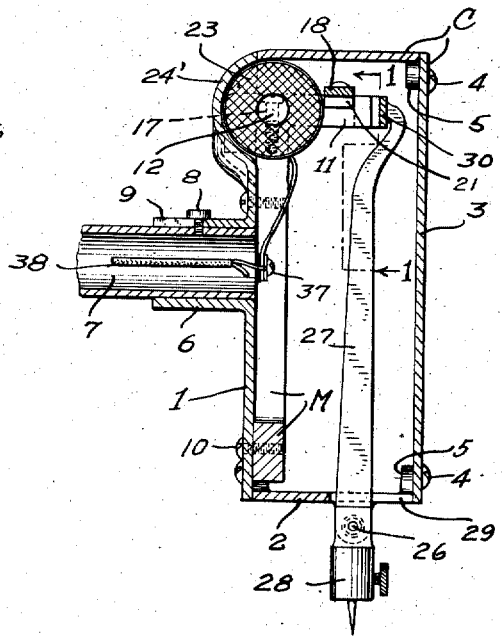
Fig. 2 is a longitudinal cross-section approximately on the broken line 2—2 of Fig. 1.
Figure 3:
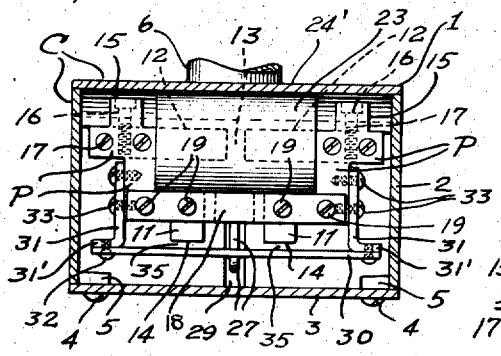
Fig. 3 shows a transverse cross-section on line 3—3 of Fig. 1.

The lower end of casing C is provided with a pair of lugs 25 carrying a suitable pivot bearing 26 for a needle arm 27, which terminates at its lower end in a needle holder 28. A slot 29 permits the needle arm to extend upwardly into the casing. The bearing 26 permits the needle arm to vibrate transversely of the casing (from left to right as viewed in Fig. 2). To the inner end of needle arm 27 is attached a magnetic vibratory strip or armature 30. The ends of this strip are secured to a pair of non-magnetic brackets 31, as by screws 32 or otherwise. The brackets 31 are in this instance secured to the polar limbs 11 by screws 33 entering screw-holes 34 in the pole pieces. The needle arm 27 is connected to the vibratory strip 30 at the center, so that the strip may vibrate symmetrically with respect to the polar faces 14. The magnetic strip 30 is preferably made of resilient magnetic metal, so that it may also act as an automatic restoring and centering spring for the needle arm. Normally, the vibratory strip or armature 30 is separated from the polar faces 14 by a pair of airgaps 35. Since these two airgaps are in series, they may be referred to as a single airgap of normally predetermined reluctance. Preferably, the reluctance of the shunt airgap 13 is made equal to the normal reluctance of the double airgap 35, so that the normal field flux divides about evenly between the shunt path 12 and the main path including the polar limbs 11 and the armatures 30. To facilitate adjustment of the relative reluctances of the airgaps 13 and 35, the normal distance of the armature from the polar faces 14 may be regulated in any practical way. For instance, one or more shims can be interposed between the armature ends and the flanges 31′ of brackets 31. Or, the fastening screws 33 may engage in longitudinal slots in brackets 31, so as to permit adjustment of the latter along the sides of the pole pieces.

The operation of the construction above described will be clear to those skilled in the art without further explanation, but I may briefly summarize it as follows: As the needle arm vibrates under the action of the record-playing needle, the armature strip 30 is moved toward and away from the polar faces 14. When the armature moves toward the pole pieces, the magnetic reluctance through the main path 11 is decreased, and therefore the greater portion of the field flux passes outside the coil 23 through the polar extensions 11 and armature 30. The next instant, when the armature 30 moves away from the polar faces 14, the flux through the shunt field 12 is increased. Consequently, this variation of flux through the coil 23 as the armature 30 vibrates, causes current impulses to be generated in the coil, and these current impulses are an electrical representation (as it were) of the mechanical movements of the needle arm. Since the armature 30 is at a far greater distance from the pivot 26 of the needle arm than is the point of the record needle, it is clear that the needle vibrations are transmitted to the armature in greatly amplified ratio, so that the smallest vibrations of the needle produce sufficient movement of the armature to generate current impulses in coil 23. The flux variations in the coil are in amplified relation to the movement of the armature, because the latter simultaneously varies the magnetic flux through the two paths in the opposite sense. That is to say, when the magnetic flux is increased through the main path, it is simultaneously decreased through the shunt path, and vice versa. Consequently, slight vibrations of the armature produce an increased magnetic effect on the coil. This is an important feature of my invention, for it enables the electric reproduction of records having several hundred lines to the inch where the needle vibrations are very delicate even in their maximum amplitude.

It is hardly necessary to explain that the coil 23 is supposed to be connected in a suitable circuit for operating loudspeaker mechanism. If needed, the current impulses in coil 23 may be amplified, as by means of radio tubes or similar devices, before operating or controlling a loudspeaker. As these circuit connections are well understood, I need not show or describe them in detail. It is sufficient that I show the ends 36 of coil 23 connected to a pair of insulated binding posts 37 on the back plate 1 of the casing. Circuit conductors 38 lead from the binding posts 37 to suitable amplifying apparatus or to the electromagnetic mechanism of a loudspeaker. By concealing the conductors 38 within the supporting tube 7, the neatness of the instrument is enhanced.

Figure 5:
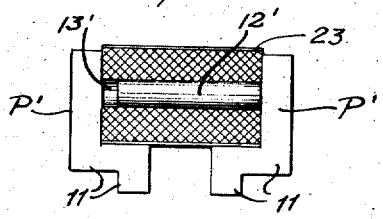
Fig. 5 shows a slightly modified form of pole pieces to provide a shunt path with an airgap at one end of the coil.

The airgap 13 in the shunt path 12 need not necessarily be arranged centrally of the coil 23, for it may be provided at any other suitable point in the shunt path. For instance, in Fig. 5 one of the pole pieces P′ is provided with a shunt extension 12′ which is separated from the other pole piece by an airgap 13′ arranged at one end of coil 23.

When I refer to the shunt airgap 13 or 13′ as a fixed airgap, I do not mean that it is in all cases nonadjustable, but I use the term "fixed" to distinguish this airgap from the variable operative airgap 35. The airgap 13 or 13′ may, if desired, be adjustable to regulate the reluctance of the shunt path in relation to the main magnetic path. For instance, one or both polar extensions 12, or the polar extension 12′, can be adjustably mounted in their respective pole pieces, as by a screw-threaded connection which allows ready adjustment of the polar extensions in an axial direction. This will be clear without the need of additional illustration.

Although I have shown and described my invention as an electric phonograph reproducer, it is clear that the armature strip 30 may be replaced by a properly supported diaphragm adapted to be actuated by sound waves, which are to be reproduced through the medium of coil 23, in the manner above set forth. When I therefore speak broadly of a vibratory magnetic member for controlling the flux of the magnetic shunt path, I mean a member adapted to be actuated by a needle arm, or an acoustic diaphragm set in motion by sound waves, or any other magnetic member suitably set in vibration. The reproducer of my invention is equally well adapted for playing lateral-cut records and vertical-cut records, depending on the way it is mounted on the supporting arm. By arranging the bracket 18 and the armature or reed 30 laterally of magnet M,—that is, to one side thereof—I make it easier to fix the polar unit in place and to connect the armature with the stylus holder. Furthermore, this arrangement of the polar unit and stylus to one side of the plane of the magnet permits an easy connection between stylus holder and armature without the necessity of perforating or otherwise mutilating the magnet and its pole pieces.

The various features of my invention may be mechanically carried out in other forms than herein set forth without departing from the scope of the appended claims.

What I claim as my invention is:

1. An electric device of the class described comprising a magnet having pole pieces arranged to provide a magnetic shunt path containing an airgap, said pole pieces having polar faces arranged to form an operative airgap, a coil mounted so as to be subject to the flux in said shunt path, and a vibratory magnetic member mounted in operative relation to said pole faces to vary said last-mentioned airgap for controlling the magnetic flux passing through said shunt path and said coil, said member being adapted to be acoustically actuated.

2. In an electric device of the class described, a magnet having a pair of pole pieces, a vibratory magnetic member mounted in operative relation to the polar faces of said pole pieces, a pair of axially aligned extensions on said pole pieces, said extensions being separated by an airgap and constituting a magnetic core of predetermined reluctance, and a coil on said core, the vibrations of said member varying the magnetic flux through said core to generate current impulses in said coil.

3. In an electric phonograph reproducer, a magnet structure having pole pieces arranged to provide two parallel magnetic paths between the magnet poles, so that the field flux divides between these paths, one of said paths containing a fixed airgap and a coil, the other path including a vibratory magnetic member arranged to provide a variable airgap in said other path, so that the vibrations of said member vary the magnetic flux through said coil, said parallel magnetic paths being so arranged that the flux passing through said vibratory member does not pass through the path containing said coil, and a needle arm connected to said member.

4. An electric device of the class described comprising a magnet having pole pieces arranged to provide a magnetic shunt path containing an airgap, a coil mounted so as to be subject to the flux in said shunt path, a vibratory magnetic strip mounted in operative relation to said pole pieces for controlling the magnetic flux passing through said shunt path and said coil, and a needle arm for actuating said magnetic strip.

5. An electric phonograph reproducer comprising a magnet having a pair of pole pieces, a vibratory magnetic strip mounted in operative relation to the polar faces of said pole pieces, means whereby said pole pieces form a magnetic core with an airgap, said core constituting a magnetic shunt path of predetermined reluctance, a coil on said core, and a needle arm for vibrating said strip in amplified relation to the needle vibrations, the vibrations of said strip varying the magnetic flux through said shunt path to generate current impulses in said coil.

6. In an electric device of the class described, a magnet having pole pieces constructed to provide two parallel paths for the magnetic flux, one of said paths having a fixed airgap and the other path having a variable airgap, a vibratory magnetic member operatively associated with said pole pieces and included in the second-mentioned path, said airgaps being so proportioned that normally said paths have practically the same magnetic reluctance, and a coil arranged to be traversed by the flux in the first-mentioned path, said magnetic member being acoustically actuated to vary the reluctance of the second-mentioned magnetic path and thereby vary the flux through said coil.

7. An electric phonograph reproducer comprising a magnet structure adapted to provide two parallel magnetic paths between the magnet poles, a path containing a fixed airgap and a coil, the other path including a vibratory magnetic member arranged to provide a variable airgap in said other path, so that vibrations of said member vary the magnetic flux through said coil, and a needle arm connected at its inner end to said member for transmitting thereto the needle vibrations in amplified ratio.

8. In an electric device of the class described, a magnet having pole pieces provided each with two extensions, one pair of opposite extensions terminating in aligned polar faces, the second pair of extensions projecting toward each other in axial alignment and being separated by a fixed airgap, said second pair of polar extensions forming a magnetic shunt path, a coil on said shunt extensions, and a vibratory magnetic member operatively associated with said polar faces to vary the magnetic flux through said shunt path and said coil.

9. In an electric phonograph reproducer, a casing adapted to be mounted on a suitable support, a magnet in said casing, said magnet having pole pieces provided each with two extensions, one pair of opposite extensions terminating in aligned polar faces, the second pair of extensions projecting toward each other in axial alignment and being separated by a fixed airgap, said second pair of polar extensions forming a magnetic shunt path, a coil on said shunt extensions, a vibratory magnetic member operatively associated with said polar faces to vary the magnetic flux through said shunt path and said coil, and a needle arm connected at its inner end to the center of said strip for actuating the same in amplified relation to the needle vibrations, said strip acting as a centralizing and restoring spring for the needle arm.

10. In an electric device of the class described, electromagnetic current-generating mechanism including a resilient magnetic strip supported for vibratory movement, a non-resilient vibratory member connected to said strip for actuating the same, said resilient strip also serving as a restoring spring for said member, and acoustic means for operating said member.

11. In an electric device of the class described, a magnet having a pair of pole pieces attached to the polar ends of the magnet, a non-magnetic plate for securing said pole pieces together in properly spaced relation independently of said magnet, a pair of non-magnetic brackets attached to said pole pieces, a vibratory magnetic strip secured at its ends to said brackets and arranged in operative relation to the polar faces of said pole pieces, a pair of axially aligned extensions on said pole pieces, said extensions being separated by an airgap and comprising a magnetic core of predetermined reluctance, a coil on said core, and means for vibrating said magnetic strip.

12. In an electric device of the class described, a magnet having pole pieces provided each with two extensions, one pair of opposite extensions terminating in aligned polar faces, a non-magnetic plate to which said last-named extensions are secured in properly spaced relation, so that said pole pieces are rigidly connected as a unit independently of the magnet, the second pair of extensions projecting toward each other in axial alignment and being separated by an airgap, said second pair of polar extensions forming a magnetic shunt path of predetermined reluctance, a coil on said shunt extensions, a pair of non-magnetic brackets secured to said first-mentioned polar extensions, a vibratory magnetic strip attached at its ends to said brackets and arranged in operative relation to said polar faces, and acoustic means for vibrating said strip to vary the magnetic flux through said coil.

13. An electromagnetic phonograph pick-up comprising a U-shaped magnet, a pair of pole pieces having polar projections arranged to form an airgap, a coil mounted between said pole pieces, a non-magnetic bracket connected to said pole pieces for rigidly holding the same and said coil in properly spaced relation as a unit, said polar projections and said bracket being arranged to one side of said magnet, an armature mounted on said unit in operative relation to said airgap, and a stylus holder connected to said armature and positioned at a distance from the plane of said magnet, so that the connection between said stylus holder and armature passes outside of said magnet and pole pieces.

14. An electromagnetic phonograph pick-up comprising a U-shaped magnet, a pair of separate pole pieces, a coil mounted between said pole pieces, a non-magnetic plate arranged transversely of said magnet to one side thereof and overlapping said pole pieces, means for securing said plate to said pole pieces to hold the same and said coil in properly spaced relation as a single rigid unit, a vibratory magnetic reed mounted on said unit as part thereof in operative relation to said coil and pole pieces, the mounting of said reed being such that it is resiliently held in predetermined normal position with respect to said pole pieces, means for attaching said unit to said magnet, and a stylus holder connected to said reed and positioned at a distance from the plane of said magnet, so that the connection between said reed and stylus holder passes outside of said magnet and pole pieces.

15. An electromagnetic phonograph pick-up comprising a magnet, a pair of separate pole pieces, a coil mounted between said pole pieces, a non-magnetic plate overlapping said pole pieces and secured thereto for rigidly holding the pole pieces and coil in properly spaced relation as a single unit, said pole pieces terminating in a pair of polar projections which extend beyond said plate and form an airgap, a vibratory magnetic reed mounted on said unit as part thereof in operative relation to said airgap, the mounting of said reed being such that it is resiliently held in predetermined normal position with respect to said airgap, means for attaching said unit to said magnet, and a stylus holder connected to said reed and positioned at a distance from the plane of said magnet, so that the connection between said reed and stylus holder passes outside of said magnet and pole pieces.

16. In an electric device of the class described, a magnet having pole pieces constructed to provide two parallel paths between the magnet poles, one of said paths including a pair of aligned polar extensions with an airgap, said extensions being substantially parallel with the polar faces of said pole pieces, a coil surrounding said polar extensions, and a vibratory magnetic member mounted in operative relation to said polar faces.

17. In an electric device of the class described, a magnet having pole pieces terminating in aligned polar faces, a vibratory magnetic member in operative relation to said pole faces, means to provide a magnetic path of predetermined reluctance between said pole pieces independently of said vibratory member, and a coil in said path, said vibratory member and said coil being so arranged that the magnetic flux passing through said member does not pass through the path containing said coil.

18. In an electric device of the class described, a magnet having pole pieces arranged to form an operative airgap, a vibratory magnetic member magnetically separated from said pole pieces and spanning the space therebetween to vary said airgap, a magnetic core extending between said pole pieces and providing a predetermined airgap independently of said member, and a coil on said core.

19. An electric phonograph reproduced comprising a magnet, a vibratory armature operatively associated with said magnet, said armature consisting of a resilient strip supported at its ends, a needle arm connected to the center of said resilient strip, and a coil electrically affected by the vibrations of said armature strip, which also acts as a centering and restoring spring for said needle arm.

20. In an electric phonograph reproducer, a magnet having pole pieces terminating in a pair of polar faces arranged to provide an operative airgap, a magnetic core mounted between said pole pieces to provide a shunt path with a fixed airgap, a coil on said core, a vibratory armature in operative relation to said polar faces to vary said first-mentioned airgap, said armature cooperating with said pole pieces to form a magnetic path in parallel with said shunt path, so that vibrations of said armature decrease the magnetic flux through one path and simultaneously increase the flux through the other path, said coil and armature being so arranged that the flux passing through the armature does not pass through the coil, and a needle arm for vibrating said armature.

21. An electromagnetic phonograph pick-up comprising a magnet, a pair of pole pieces, a coil mounted between said pole pieces, a flat non-magnetic plate secured to said pole pieces for rigidly holding the same and said coil in assembled condition as a unit, said plate being arranged transversely of said magnet and to one side thereof, a vibratory magnetic reed mounted on said unit in operative relation to said coil and pole pieces, the mounting of said reed being such that it is resiliently held in predetermined normal position with respect to said pole pieces, means for attaching said unit to said magnet, and a stylus holder connected to said reed and positioned at a distance from the plane of said magnet, so that the connection between said reed and stylus holder passes outside of said magnet and pole pieces.

22. An electromagnetic phonograph pick-up comprising a magnet, a pair of pole pieces extending laterally of said magnet, a coil mounted between said pole pieces, a single non-magnetic bracket having a straight flat section secured to one face of said pole pieces for rigidly holding the same and said coil in properly spaced relation as a unit, said bracket extending transversely of said magnet and to one side thereof, an armature, means for mounting said armature on said unit as part thereof, means for attaching said unit to said magnet, and a stylus holder connected to said armature.

23. An electromagnetic phonograph pick-up comprising a casing adapted to be operatively mounted in relation to a record on a turntable, a magnet supported in said casing in substantially upright position, a pair of separate pole pieces, non-magnetic means arranged laterally of said magnet for securing said pole pieces together in properly spaced relation, said means and pole pieces constituting a single rigid unit, a vibratory armature and a coil supported on said polar unit in operative relation to said pole pieces, screw means for securing said unit with its armature and coil to said magnet, and a stylus holder connected to said armature and projecting from said casing, said stylus holder being positioned to one side of the plane of said magnet.

24. An electromagnetic pick-up device comprising bracket means for supporting pole pieces and a magnetic reed in cooperative relation to each other, said bracket means and the parts supported thereby constituting a unitary structure, a magnet and means for rigidly securing the unitary structure aforesaid to said magnet with the pole pieces properly related to the poles of the magnet and whereby said pole pieces are immovably connected with the permanent magnet and the reed is then movably related to said immovably held pole pieces, said bracket means being arranged to one side of said magnet.

25. In an electromagnetic pickup having a magnet, a unitary structure attached to the polar ends of said magnet, said unitary structure comprising pole pieces, a coil and an armature, said parts being held in operative relation by rigid non-magnetic means forming part of said unitary structure, and a stylus holder connected to said armature, said unitary structure and stylus holder being arranged to one side of the plane of said magnet.

26. An electromagnetic pickup comprising a magnet, pole pieces for said magnet, non-magnetic means arranged laterally of said magnet for connecting said pole pieces in properly spaced relation as a rigid unit, a coil operatively associated with said pole pieces, a vibratory armature, means for mounting said armature on said unit, means for attaching said unit to said magnet, and a stylus holder connected to said armature and positioned to one side of the plane of said magnet.

27. In an electromagnetic device of the class described, the combination of a magnet, a pair of pole pieces, a coil operatively associated with said pole pieces, non-magnetic means positioned laterally of said magnet for securnig said pole pieces and coil in properly spaced relation as a single rigid unit, a vibratory armature, means for mounting said armature on said unit in operative relation to said pole pieces, means for attaching said unit to said magnet, and a stylus holder connected to said armature and positioned to one side of the plane of said magnet.

28. An electromagnetic pickup comprising a magnet, pole pieces for said magnet, non-magnetic means for connecting said pole pieces in properly spaced relation as a rigid unit, a coil operatively associated with said pole pieces, a vibratory armature, means for mounting said armature on said unit laterally of said magnet, means for attaching said unit to said magnet, means for adjusting the normal relation between said armature and pole pieces, and a stylus holder connected to said armature and positioned to one side of the plane of said magnet.

29. An electromagnetic phonograph pick-up comprising a magnet, a pair of pole pieces, a single non-magnetic bracket connected to both pole pieces for securing them in properly spaced relation, said bracket and pole pieces constituting a rigid unit, a coil mounted on said unit, a vibratory armature, means for mounting said armature on said unit as part thereof, means for securing said unit to said magnet, said armature being positioned laterally of said magnet, and a stylus holder for operating said armature.

30. In an electromagnetic pickup, the combination of a U-shaped permanent magnet, a pair of pole pieces, a non-magnetic bracket, screw means for securing said pole pieces to said bracket in properly spaced relation, an armature and coil operatively associated with said pole pieces, said bracket and pole pieces together with said armature and coil constituting a single unit structure, means for attaching said unit structure to said magnet in such position that said bracket and armature are arranged laterally of said magnet, a stylus holder positioned at a distance from the plane of said magnet, and a rigid connection between said armature and stylus holder, said connection passing outside of said magnet and pole pieces.

31. An electromagnetic pickup comprising a magnet, a bracket, pole pieces secured to said bracket in properly spaced relation, whereby said bracket and pole pieces constitute a unitary structure projecting laterally of said magnet, an armature and coil operatively mounted on said structure, means for securing said structure and the parts carried thereby to said magnet with the pole pieces properly related to the poles of the magnet, means for adjusting the normal position of said armature with respect to the pole pieces, a stylus holder positioned at a distance from the plane of said magnet, and a rigid connection between said armature and said stylus holder, said connection passing outside of said magnet and pole pieces.

32. An electromagnetic pickup comprising a substantially U-shaped magnet, pole pieces having a pair of opposed projections arranged to provide an airgap and a second pair of opposed projections more widely separated, a bridge piece overlying the last-named projections and secured thereto, said bridge piece being arranged laterally of said magnet and with said pole pieces constituting a single rigid unit, an armature and coil operatively mounted on said unit, means for securing said unit to the legs of said magnet, a stylus holder positioned at a distance from the plane of said magnet, and a rigid connection between said armature and said stylus holder, said connection passing outside of said magnet and pole pieces.

33. An electromagnetic device adapted for conversion of energies for the reproduction of sound, comprising a permanent magnet having poles, a unitary assembly detachably associated with said magnet at the poles thereof and comprising polar shoes, at least one coil mounted on said shoes, an armature vibratably associated with said coil and shoes, said armature being arranged outside of said coil, and an actuating means associated with said armature for transmission of vibrations to or from the same.

ADOLPH A. THOMAS.